United States Patent [19]
Geller et al.

[11] Patent Number: 5,062,154
[45] Date of Patent: Oct. 29, 1991

[54] MID RANGE UV COMMUNICATIONS

[75] Inventors: Myer Geller; George A. Evanoff, Jr., both of San Diego, Calif.

[73] Assignee: The United States of America as represented by the Secretary of the Navy, Washington, D.C.

[21] Appl. No.: 318,988

[22] Filed: Mar. 3, 1989

[51] Int. Cl.$^5$ .............................................. G02F 1/00
[52] U.S. Cl. .................................... 359/154; 250/372
[58] Field of Search ........................ 455/617; 250/372

[56] References Cited

U.S. PATENT DOCUMENTS 4,493,114  1/1985  Geller et al. ........................ 455/617
4,763,326  8/1988  Krick .................................. 455/617

OTHER PUBLICATIONS

Winston, "Principles of Cylindrical Concentrators for Solar Energy", *Solar Energy*, V. 17, pp. 255–258, 1975.
Rabl, "Solar Concentrators with Maximal Concentration for Cylindrical Absorbers", *Applied Optics*, V. 15 N. 7, 7/76.
Welford et al., *The Optics of Non Imaging Concentrators*, 1978.

Primary Examiner—Thomas H. Tarcza
Assistant Examiner—David Cain
Attorney, Agent, or Firm—Harvey Fendelman; Thomas Glenn Keough

[57] ABSTRACT

Mid-range communications are improved with a transmitter having an elongate omni-directionally radiating tube of UV energy that are focussed by a compound parabolic reflector to within a designated azimuth and/or elevation. The configuration of the reflector gives a broad beam directivity over a receiver target area to the exclusion of other bearings and elevations such that selected receiving stations can be designated between moving or unstable communication platforms, such as aircraft or ships. Because scattering occurs at angles larger than the direct beam, the requirement for accurate tracking mechanisms is further relaxed. Furthermore, these extra scattered photons increase the link distance. The need for very small divergence transmitters, like lasers, is eliminated permitting inexpensive, efficient UV lamps to be used with compound reflectors as transmitter sources.

3 Claims, 5 Drawing Sheets

MID RANGE UV COMMUNICATIONS

STATEMENT OF GOVERNMENT INTEREST

The invention described herein may be manufactured and used by or for the Government of the United States of American for governmental purposes without the payment of any royalties thereon or therefor.

CROSS REFERENCE TO RELATED APPLICATIONS

This application is related to co-pending applications in the United States Patent and Trademark Office, Ser. No. 165,207 entitled "Multi-Channel, Covert, Non-Line-Of-Sight UV Communication," by Myer Geller and Serial No. 07/314,027 entitled "Improved UV Communication By Spectral Bandwidth Reduction," by Myer Geller.

BACKGROUND OF THE INVENTION

Optical communication links generally utilized lasers with small beam divergences in a line-of-sight mode. For all wavelength regions, except the solar blind UV, the receiver must be physically located within the direct beam cone. This implies that very accurate tracking and pointing mechanisms must be employed so that the and transmitter are locked onto each other. This is particularly true for communication between rolling and pitching ships, manoeuvering aircraft, helicopters and trucks in rough terrain.

Maximum ranges are obtained when the laser beam has a minimum value of divergence, for example, in the range of 0.1 milliradian and an appropriate receiver is provided which senses this direct beam. An elaborate pointing mechanism must be provided at the transmitter to aim the narrow pencil beam. Delicate and complicated supporting equipments may be required which might be prohibitively expensive.

Two of the most important atmospheric parameters that determine range are the ozone concentration and the scattering co-efficient. Ozone completely eliminates a photon by absorption. Scattering changes the direction of a photon with the possibility of this photon still being used as a signal if it strikes the detector. In the solar-blind region of the UV, the scattered radiation can be so significant that the communication can be effected with the receiver being outside of the direct cone. Signal photons are available in a much larger (scattering) cone. This permits a relaxation of the demands for accurate pointing (boresighting of the transmitter-receiver).

FIG. 1 shows, symbolically, a transmitter with some value of beam divergence. The solid angle that is subtended by this divergence constitutes the direct beam. In this cone, a photon reaches the detector without being scattered. All non-UV communication links operate in this mode. Because photon scattering increases inversely as the fourth powe of the wavelength, UV scattering and UV communication links can operate in the scattered mode as well as the direct mode.

There are two types of scattering in this spectral region: (a.) Rayleigh scattering of atmospheric molecules and (b.) Mie scattering of atmospheric particulates which is strongly biased in the forward direction. The Rayleigh scattering is most important for large angular scattering as in the UV communication links around and over buildings. Such a UV communication system has been designed that provides for non- line-of-sight omnidirectional communications via UV radiation in the solar-blind region of the electromagnetic spectrum and o 10 is disclosed in U.S. Pat. No. 4,493,114. The 253.7 nm UV radiation provides reliable short range communications with the disclosed UV source and the UV is totally absorbed beyond relatively short distances.

Mie scattering is an additional scattering for UV communication links which are almost line-of-sight and an important feature of this inventive concept for a source of signal photons is provided in a large cone surrounding the direct beam. With this feature the requirement that the detector and transmitter be accurately boresighted to collect the signal photons, is drastically relaxed. This feature also means that communications between moving, rolling and pitching transmitters and receivers are readily effected without signal fade-out with an increase in operable range.

At angles greater than beam divergence the path loss would increase very rapidly. FIG. 2 shows the path loss using a transmitter with a divergence of 2 degrees and is a demonstration of a typical result from the analysis of a typical mid-range UV communication link., which is: (1) Path loss of a communication link is calculated assuming that each UV photon either traverses the atmosphere unattenuated or is absorbed by an ozone molecule, or is singly scattered by Rayleigh (molecular) or Mie (particulate). (2) The ozone concentration is nominally 10 PPB, a typical value in mid-ocean. (3) The scattering coefficient is 0.434 inverse km. (4) The date rate is 2400 baud, which can support voice. (5) Maximum permissible path loss to obtain reasonable bit error rates for recognizable voice is 160 dB.

Detection of UV photons beyond the communication distance (a distance beyond the 160 db loss distance) depends largely on the detector integration time, the time required to perform an azimuthal scan, and the time the transmitter is operating. Detection range is defined as the distance where path loss is 20 db greater than the communication limit, in other words at 180 db.

The path loss for a link distance of 10 km. is shown for the angular misalignment between transmitter and receiver. The transmitter beam divergence is 2 degrees. The curve shows that a 20 degree transmitter-receiver misalignment can be tolerated up to a maximum 160 dB loss. If scattering were absent, the path loss would continue to increase rapidly as indicated by the dotted line (the direct, non-scattered beam). The scattered photons provide usable energy in a much larger cone which increases the link distance.

The curve of FIG. 2 shows that a 20 degree transmitter-receiver misalignment can be tolerated at the maximum 160 dB loss. Analysis shows that the same results are obtained when the transmitter beam divergence is increased to a maximum value of the permissible pointing error. It is this virtue that permits the usage of inexpensive, focussed non-laser , incoherent sources.

FIG. 3 depicts the maximum transmitter-receiver misalignment permissible as a function of link distance for mid-ocean. For example, for a link distance of 12 km, the receiver may be aimed 10 degrees from the line-of-sight and the communication link remains effective. On the other hand, as indicated above, the transmitter beam divergence could be increased to a maximum value of 10 degrees.

In other words, the data presented in FIG. 3 represents the maximum transmitter misalignment permissible as a function of link distance for mid-ocean. For example, for a link distance of 10 km the transmitter can be aimed 20° from the line-of-sight and the communication link would still be effective, or stated differently, the same results can be obtained with a transmitter of plus or minus ° beam divergence.

Thus, a continuing need exists in the state-of-the-art for a UV transmitter having a directional capability of about 20° to assure more reliable mid-range UV communications.

SUMMARY OF THE INVENTION

The present invention is directed to providing an apparatus for directing a UV beam of controlled divergence to assure mid-range communications in the solar-blind region of the ultraviolet spectrum. An omni-directionally UV source, radiating in the tens of watts level, is contained at the convergence area of a parabolic reflector so that a UV beam of preselected divergence is transmitted in a controlled divergence beam.

A prime object of the invention is to provide for an apparatus for directing a controlled divergence beam of an omni-directional UV source.

Yet another object of the invention is to provide a UV communication system having the capability for selectively communicating with a receiver at a desired elevation and/or azimuth.

These and other objects of the invention will become more readily apparent from the ensuing specification and drawings when taken in conjunction with the appended claims.

DESCRIPTION OF THE PREFERRED EMBODIMENT

Figure 1:
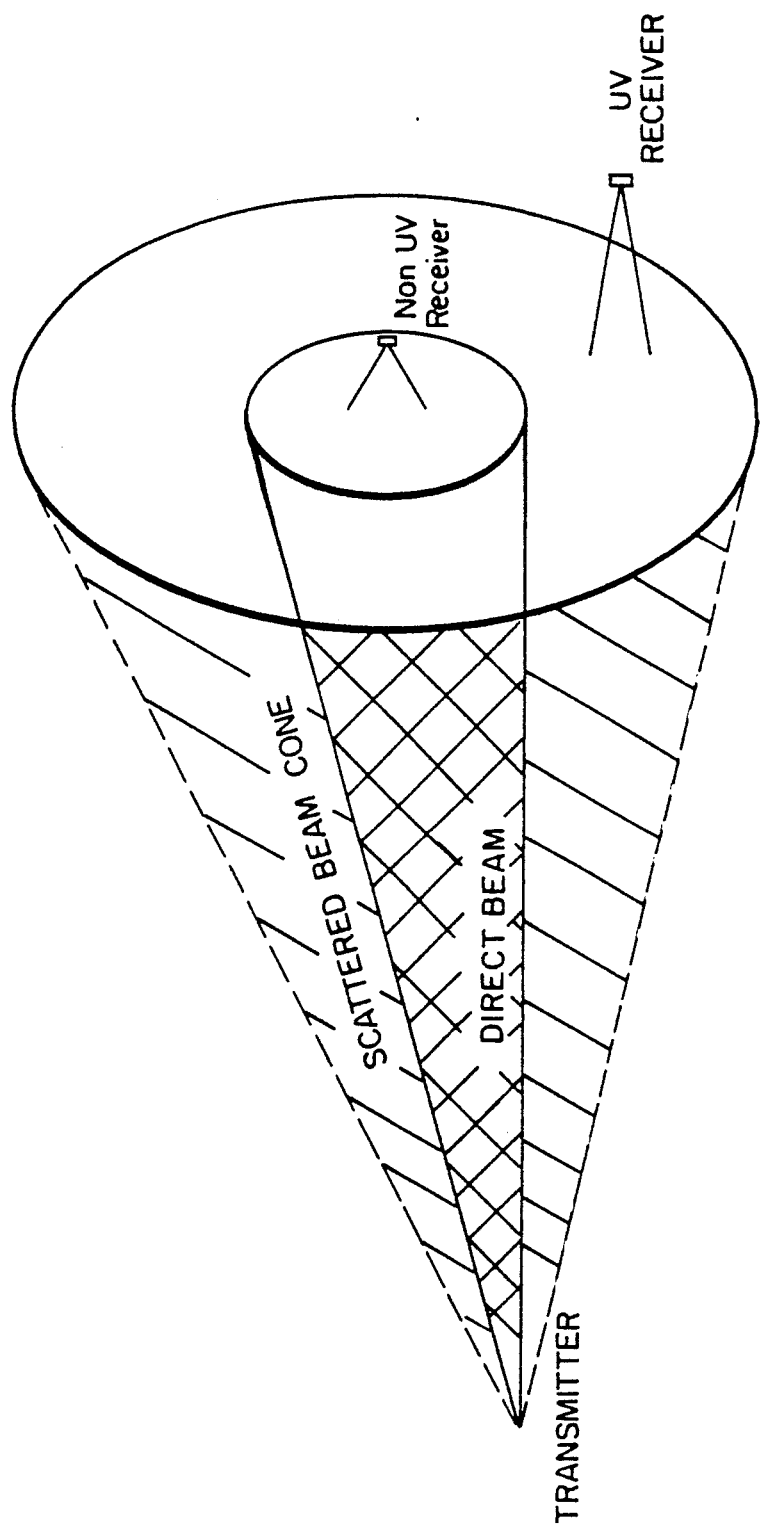
FIG. 1 is a symbolical representation of a transmitter with some value of beam divergence.
Figure 2:
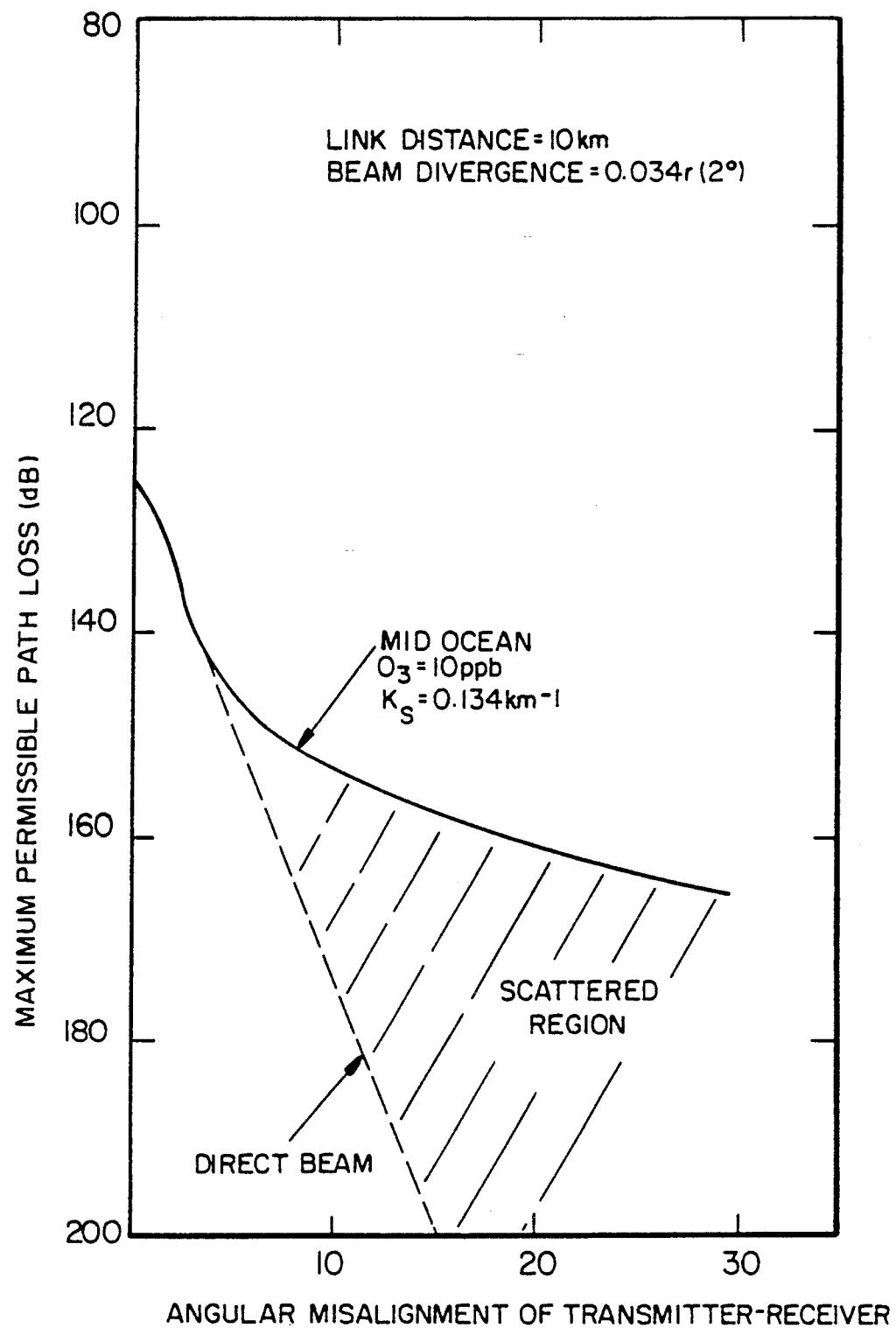
FIG. 2 is a demonstration of angular distribution in the far field for a beam having a 0.034 radian divergence.
Figure 3:
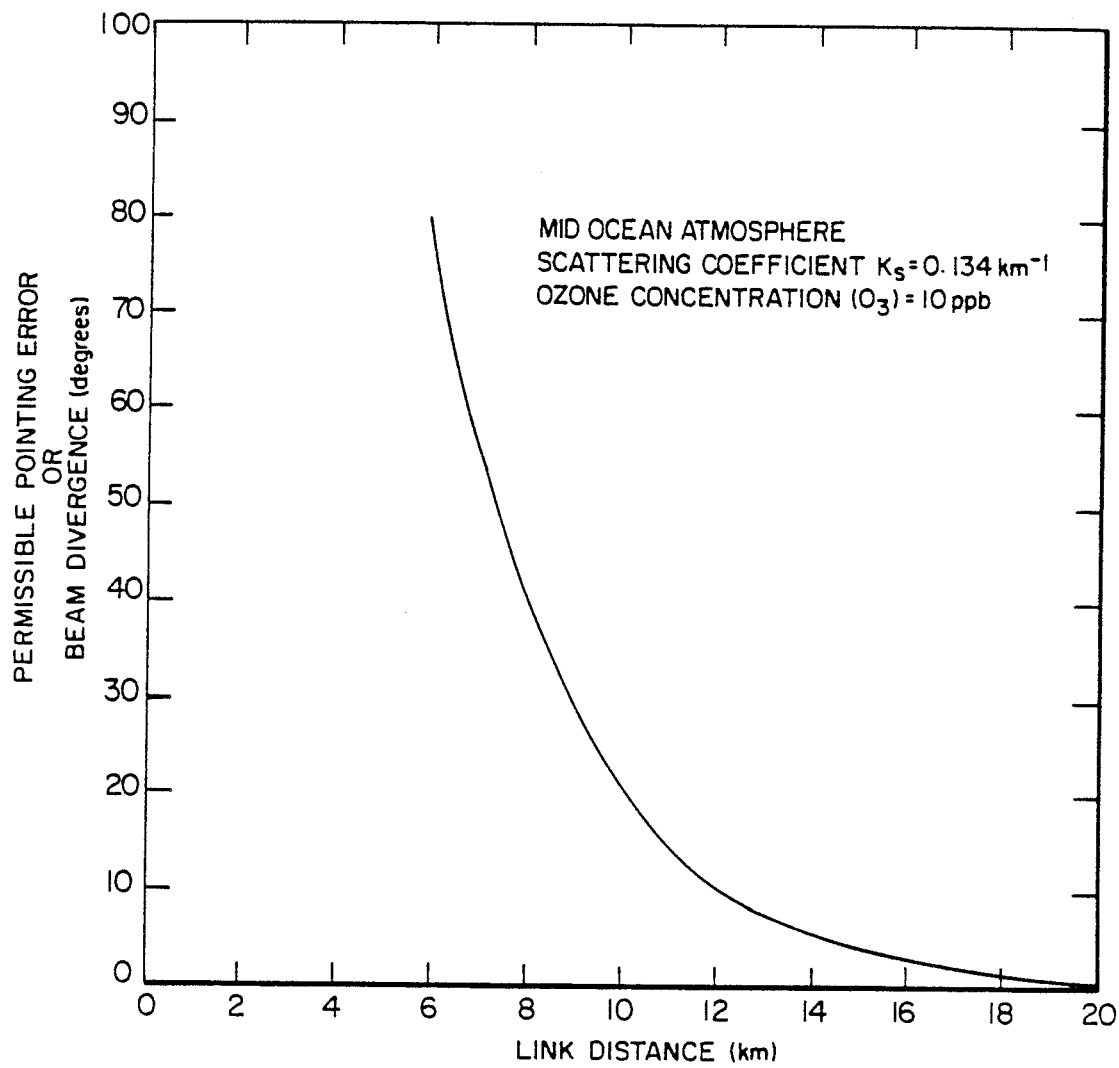
FIG. 3 depicts the maximum permissible laser beam divergence as a function of link distance.
Figure 4:
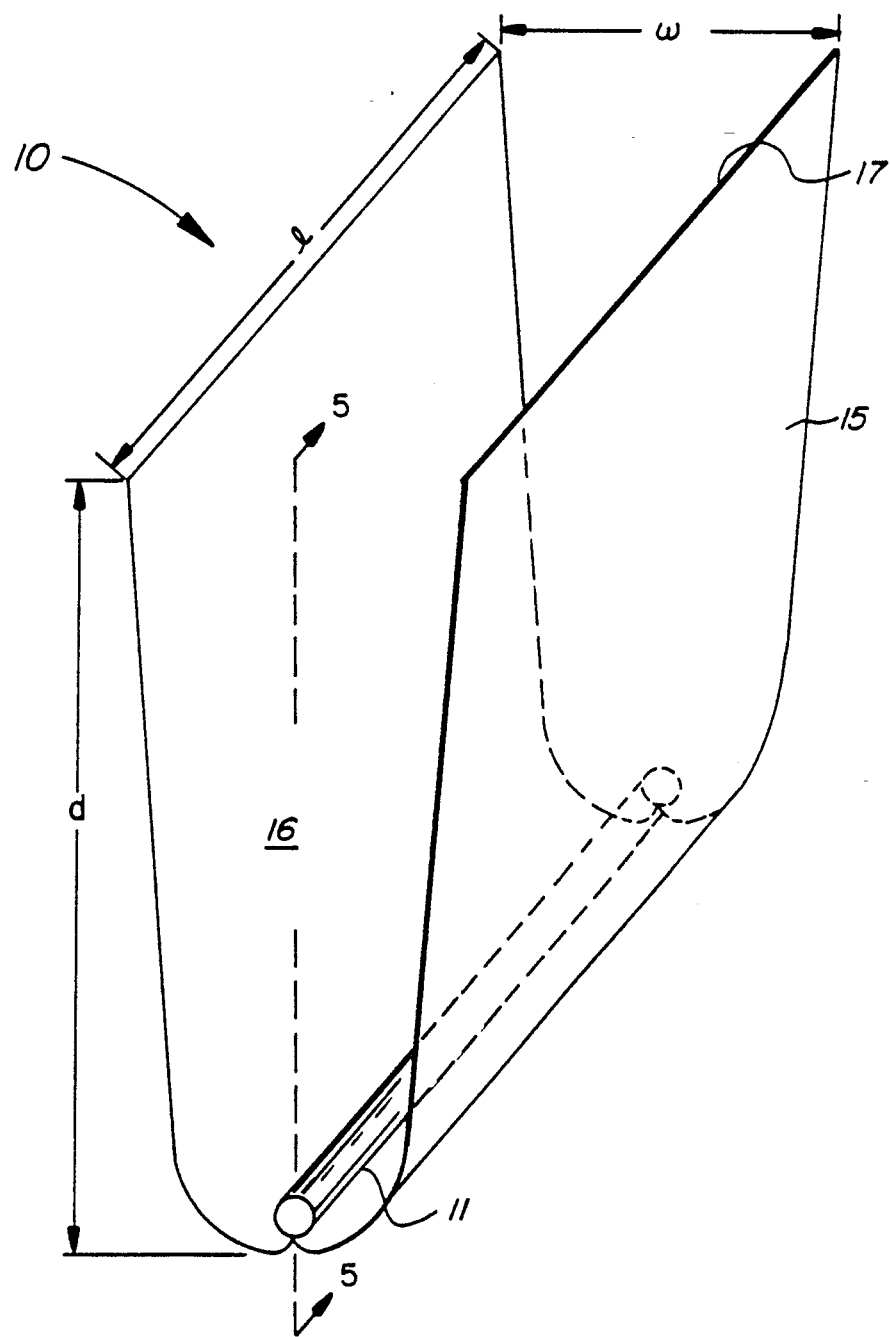
FIG. 4 is an isometric view of the inventive concept having a beam divergence of about plus or minus 20°.
Figure 5:
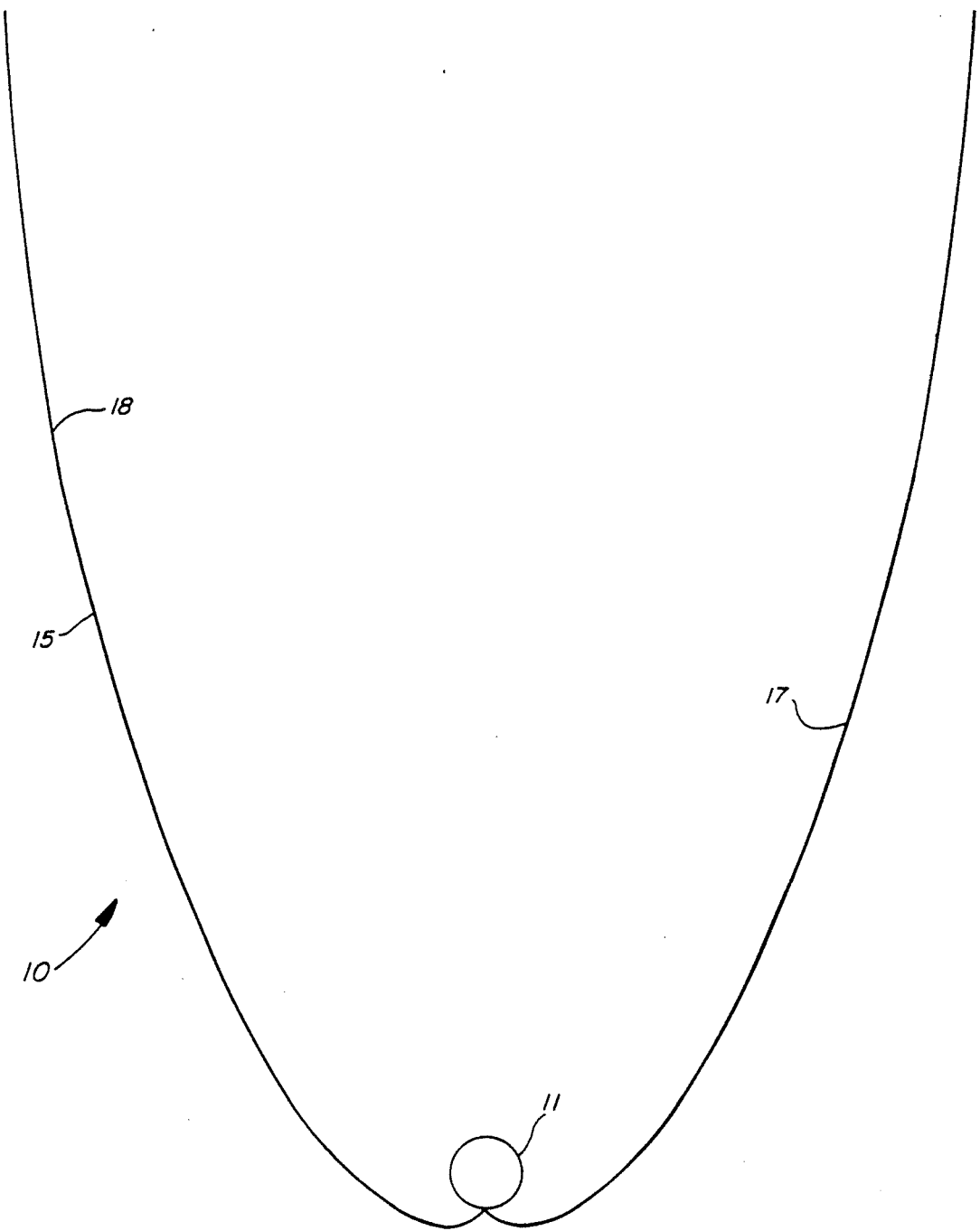
FIG. 5 is a cross-sectional view taken generally along lines 5-5 in FIG. 4.

Referring now to FIGS. 5 and 6 an improved transmitter 10 of UV radiation in the solar-blind spectrum has been designed to avoid the bulky and expensive construction of conventional KrF lasers. The configuration and design gives a predetermined broad directivity in a desired azimuth and/or elevation which is not possible with the aimed lasers or the omni-directional system of the above-identified patent.

As a result, this design permits a selective communication between selective ones of transmitters and receivers in an environment where it may be desirable, for one reason or another to exclude the transmissions from other. Since energy of interest is transmitted in a broad beam-like pattern, precise aiming or alignment of transmitters and receivers is avoided so that this design is particularly adaptable to situations where the transmitters and receivers are moving or where they are located on relatively unstable platforms such as ships and aircraft. In addition the atmosphere has unique UV scattering properties that allow almost or non-line-of-sight recivers to function responsively.

The transmitter 10 has a UV lamp 11 which is suitably modulated to transmit the desired information in accordance with well established techniques, such as those employed, for example, in the above-cited patent. Any one of a variety of suitable UV sources could be selected, for example an 18 inch long germicidal lamp marketed by General Electric Corporation under the Model No. G25T8 could be selected. Irrespective which particular model is chosen from commercially available units, the source is oapable of radiating in the tens of watts power level.

This identified tube has about a one-inch diameter and is conveniently located at the focal area of a parabolic reflector 15. The parabolic reflector, also know as a compound parabolic reflector has internal surfaces 17 and 18 which are appropriately reflective, by being either a mirror-like surface or being suitably polished to present a reflective surface so that it reflects a directed beam at a desired angle. For example, a parabolic reflector 15 could be fabricated with dimensions D equalling about 14.7 inches, a length of about 18 inches, and a width of about 9.3 inches to direct a plus or minus 20° beam for selective mid-range UV communications.

A compound parabolic design in accord with this inventive concept is routinely fabricated by drawing upon established designs of solar energy concentrators that have acceptance angles the are substantially the same as a desired transmitted divergence angle in this disclosed UV transmitter design. A wide variety of light and solar energy concentrator designs may be chosen by a routineer from the text *The Objects of Non Imaging Concentrators Light and Solar Energy* by W. T. Welford and R. Winston, Academic Press, New York (1978). Similar designs also are discussed in the articles entitled "Principles of Cylindrical Concentrators for Solar Energy" by R. Winston et al appearing in *Solar Energy* vol. 17, pgs. 255-258, Pergamon Press (1975), Great Britain and in "Solar Concentrators with Maximal Concentration for Cylindrical Absorbers" by Ari Rabl appearing in *Applied Optics* vol. 15, no. 7, July 1976.

The publications identified above place an energy absorber in an absorber area located at a focal concentration area of a compound parabolic reflector. This placement has the effect of concentrating the sun's rays to the level where useful temperatures are attained.

In contradistinction, whereas the solar energy concentrator art has concerned itself with the concentration of incoming solar energy, this inventive concept seeks to make use of the established solar energy designs and use them differently, that being, to selectively direct UV modulated energy from a relatively concentrated area. This arrangement enables secure communications in the mid-range due to a 10 to 20 db increase in beam fluency with a UV lamp as identified above. Obviously, another 10 to 20 db gain in signal may be obtained when other lamp designs are chosen so that sufficient signal energy is available.

The results of only one specific 10 km communication link has been referred to. It is obvious that other configurations are within the teachings of this inventive concept. For example, if a 30 degree tolerance is specified for transmitter-receiver misalignment, then the link can extend to only 9 km. for a 10 degree tolerance the link distance increases to 12 km. there are other tradeoffs between data rate, transmitter power, ozone concentration etc. to name a few.

Obviously, many modifications and variations of the present invention are possible in the light of the above teachings. It is therefore to be understood that within the scope of the appended claims the invention may be practiced otherwise than is specifically described.

I claim:

1. An apparatus for communicating in the UV spectrum with a predetermined UV beam divergence and with the unique UV properties of scattering in an extended mid-range of about ten to fifteen kilometers comprising:

means for generating an omni-directionally radiated incoherent ultraviolet signal in the tens of watts power range and means containing the generating means at a predetermined focal length for defining a compound parabolic reflecting surface to radiate UV energy at said predetermined UV beam divergence thereby eliminating the need for boresighting and the otherwise required pointing, tracking and receiving mechanisms.

2. An apparatus according to claim 1 in which the generating means is an elongate UV lamp tube having the capability for radiating UV energy in the tens of watts range.

3. An apparatus according to claim 2 in which the parabolic reflecting means is trough-shaped to accommodate the elongate UV lamp in an elongate area that coincides with its elongate focal area.

* * * * *